(12) United States Patent
Dolan

(10) Patent No.: US 12,504,830 B2
(45) Date of Patent: Dec. 23, 2025

(54) COMPUTER INPUT DEVICE AND METHOD OF USE

(71) Applicant: Kevin Dolan, Doylestown, PA (US)

(72) Inventor: Kevin Dolan, Doylestown, PA (US)

( * ) Notice: Subject to any disclaimer, the term of this patent is extended or adjusted under 35 U.S.C. 154(b) by 0 days.

(21) Appl. No.: 18/948,781

(22) Filed: Nov. 15, 2024

(65) Prior Publication Data

US 2025/0110576 A1 Apr. 3, 2025

Related U.S. Application Data

(63) Continuation of application No. 18/244,850, filed on Sep. 11, 2023, now Pat. No. 12,182,340.

(51) Int. Cl.
*G06F 3/02* (2006.01)
(52) U.S. Cl.
CPC .................. *G06F 3/021* (2013.01)
(58) Field of Classification Search
CPC ........................................................ G06F 3/021

USPC ......................................................... 345/156
See application file for complete search history.

(56) References Cited

U.S. PATENT DOCUMENTS

| | | | |
|---|---|---|---|
| 2002/0113778 A1* | 8/2002 | Rekimoto | G06F 3/046 345/173 |
| 2005/0042584 A1* | 2/2005 | Ekberg | B42D 1/06 434/169 |
| 2008/0285213 A1* | 11/2008 | Tan | G06F 3/021 361/679.55 |

* cited by examiner

*Primary Examiner* — Calvin C Ma
(74) *Attorney, Agent, or Firm* — IP Works Law PLLC

(57) ABSTRACT

An education information system includes a data reading unit having a housing with a flat top surface and a plurality of wireless data reading units in the housing. The data reading unit is configured to wirelessly read educational data from at least one card that contains the education data, and to further transmit the educational data to a computer screen for display. Each educational data-containing card includes an embossed icon on a top card surface, the embossed icon being representative of the particular educational data stored thereon.

16 Claims, 5 Drawing Sheets

COMPUTER INPUT DEVICE AND METHOD OF USE

The present application is a continuation of U.S. patent application Ser. No. 18/244,850, filed on Sep. 11, 2023 entitled "COMPUTER INPUT DEVICE AND METHOD OF USE," which is incorporated herein by reference in its entirety.

BACKGROUND OF THE INVENTION

The present invention relates to a computer input device and a method for using the same. More particularly, the present invention provides a device which will allow for a user to input information into the computer via a hands-on, manipulative based experience, significantly different from that achieved with a standard keyboard, mouse, or joystick.

While there are many different types of computer inputs available many of them include a keyboard or mouse type input. There is nothing currently which allows for an individual to use a manipulative based input.

In today's world education is moving more and more toward the use of technology. While technology can be helpful, individuals learn in different ways and using a keyboard only may in fact be detrimental to some students' education. There are many people who learn through physical touch or object association. By only having a keyboard this takes away from that ability. This means that individuals may struggle to learn just because there is not an appropriate input device.

In other embodiments older individuals may not be familiar with a computer or have physical limitations. It is no secret that in some instances it can be difficult to learn how to use a computer. One of the reasons for the learning curve is the keyboard. The data entry method can be difficult to learn and navigate. This can lead to one not wishing to learn how to use a computer at all.

Consequently, there is a need for an improvement in the art of computer use. The present invention substantially diverges in design elements from the known art while at the same time solving a problem many people face when learning in general but especially when using a computer. In this regard the present invention substantially fulfills these needs.

SUMMARY OF THE INVENTION

The present invention provides a computer input device wherein the same can be utilized for providing convenience for the user when using a computer or computer-based learning program. The computer input device includes a housing comprised of a first section and a second section. The first section is configured to house electrical components. The second section is configured to receive an input object. An input reader is operably placed within the second section such that the input reader is configured to receive information from the input object. The computer input device is configured to send the information from the input object to a computer as a computer input.

Another object of the computer input device is to have an on/off switch.

Another object of the computer input device is to have the input reader use Hall Effect devices.

Another object of the computer input device is to have the input object have a plurality of magnets embedded on a back side of the input object.

Another object of the computer input device is to have the input reader be an RFID reader.

Another object of the computer input device is to have an indentation located within the second section of the housing. The indentation is configured to accept the input object.

Another object of the computer input device is to have the input object and the indentation have a matching geometric shape. The shape ensures that the input object is properly placed over the input reader.

Another object of the computer input device is to have the input object display one of a select group of items selected from the group of: a letter character, a numeral, a symbol, a drawing, or a character string.

Another object of the computer input device is to have the input object have a cutout edge.

Another object of the present disclosure is to include an input object configured to work with a computer input device. The input object includes a physical object having a front side and a back side. The front side of the physical object contains a display thereon. The backside of the physical object has at least one device capable of communicating with a computing device. The device will communicate an input to a computer which will match the display on the front side of the physical object. The input object is configured to be read by a computer input device.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
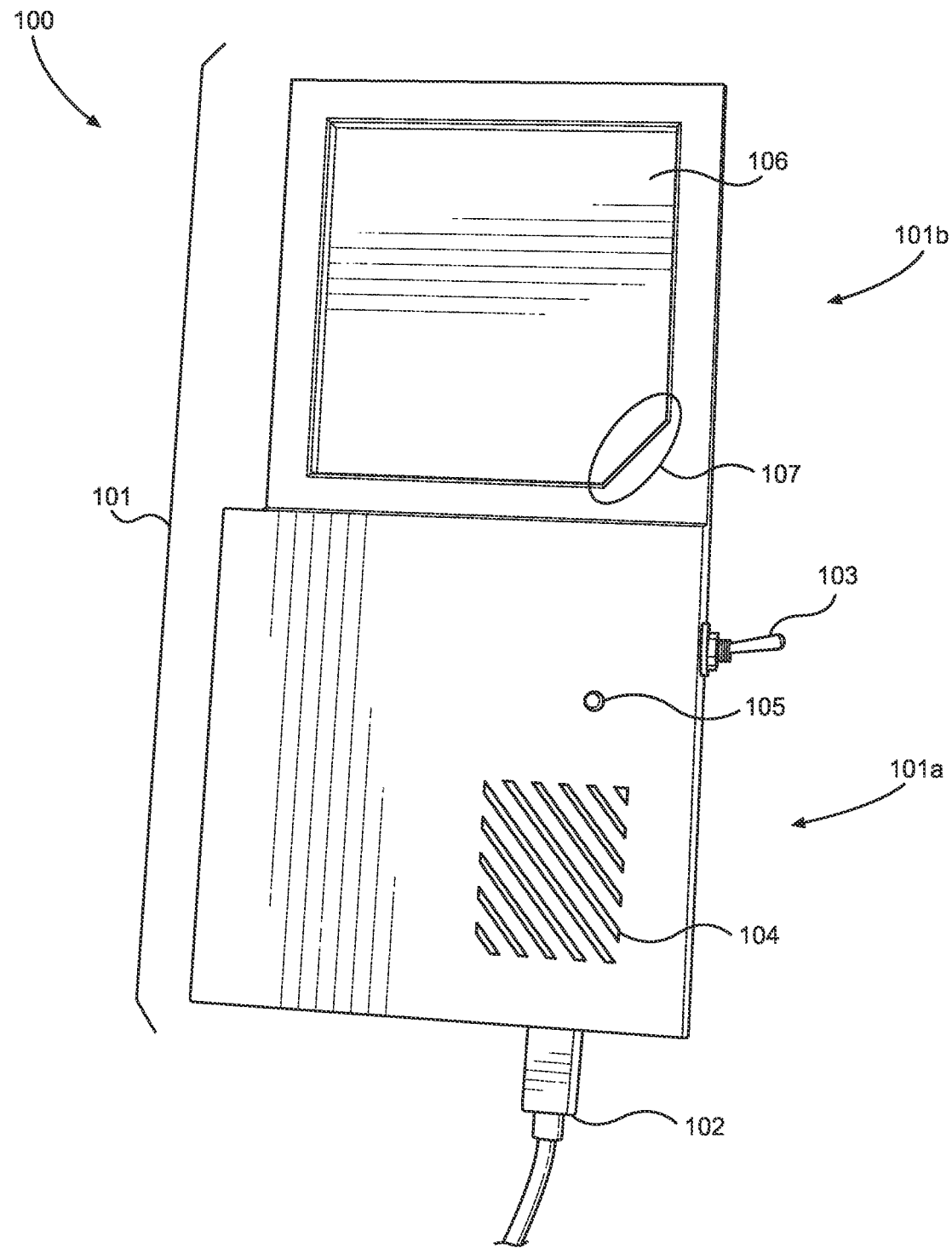
FIG. 1 shows a perspective view of an embodiment of the computer input device.

With regard to the reference numerals used, the following numbering is used throughout the drawings.

| | |
|---|---|
| 100 | Computer input device |
| 101 | Housing |
| 101a | First section |
| 101b | Second section |
| 102 | Input wire |
| 103 | Power switch |
| 104 | Vents |
| 105 | Power indicator |
| 106 | Indentation |

| | |
|---|---|
| 107 | Cut off corner |
| 301 | Input objects |
| 301a | Rear side |
| 302a | First cut corner |
| 302b | Second cut corner |
| 303a | Symbol |
| 303b | Letters |
| 303c | Numbers |
| 303d | Character string |
| 304 | Magnets |
| 401 | Cover |
| 402 | RFID tag |
| 501 | Power source |
| 502 | Microprocessor |
| 503 | Input reader |
| 504 | Memory |
| 505 | transceiver |
| 506 | Computer |
| 601 | Learning program |
| 602 | Computer screen |

DETAILED DESCRIPTION OF THE INVENTION

Reference is made herein to the attached drawings. Like reference numerals are used throughout the drawings to depict like or similar elements of the computer input device and method for using the same. For the purpose of presenting a brief and clear description of the present invention, a preferred embodiment will be discussed as used for the computer input device and method for using the same. The figures are intended for representative purposes only and should not be considered to be limiting in any respect.

Referring now to FIG. 1, there is shown a perspective view of an embodiment of the computer input device. The computer input device 100 may take different forms and some components may be duplicated as described herein. In one embodiment the computer input device 100 is comprised of a housing 101. In the shown embodiment the housing 101 has a first section 101a which encloses various electronic components as required by the computer input device 100. These components will be detailed in the description of FIG. 5.

In one embodiment the computer input device 100 has an input wire 102 which enters through a port in the first section 101a of the housing 100. The input wire 102 will connect the computer input device 100 to the desired computer. In another embodiment instead of an input wire 102, there is a wireless device which will connect the computer input device 100 to a desired computer. In one embodiment there is a power switch 103 connected to the first section 101a of the housing 101. In the shown embodiment the power switch 103 is shown as a toggle switch. However, in other embodiments different switch types may be used. In additional embodiments the power switch 103 may be substituted for a power button.

In different embodiments additional components may be attached to the first section 101a of the housing 100. In one embodiment these components include vents 104. In the shown embodiment the vents 104 are shown on the top of the first section 101a, however, the vents 104 may also be located in any necessary location around the housing 101. In another embodiment a power indicator 105 is secured to the first section 101a of the housing 101. In the shown embodiment the power indicator 105 is a light which will illuminate when the computer input device 100 is receiving power and is in the on configuration.

In the shown embodiment the housing 101 also includes a second section 101b. in the shown embodiment the second section 101b of the housing 101 includes step down from the first section 101a. This step allows for the computer input device 100 to be reduced in size and weight. In many embodiments the second section 101b of the housing 101 includes an indentation 106. The indentation 106 marks the location of the input reader within the computer input device 100. The indentation 106 will allow for input objects to be placed therein. The input objects will be detailed in the description of FIG. 3 and FIG. 4.

In one embodiment the input objects will need to be placed within the indentation 106 with designed orientation. In order to facilitate the proper orientation in these embodiments the indentation 106 will have a specific shape. In the shown embodiment the indentation 106 is shown as a square. The square has a cut off corner 107. In these embodiments the input objects will have a matching shape and will ensure proper orientation within the indentation 106.

While the housing 101 is described as having a first section 101a and a second section 101b, it should be understood that these sections do not need to be physically distinct and that these sections are being described for the functionality represented. The housing 101 may have, for example, a first section 101a placed directly beneath and connected to the second section 101b where the indentation 106 or reader is located.

Figure 2:
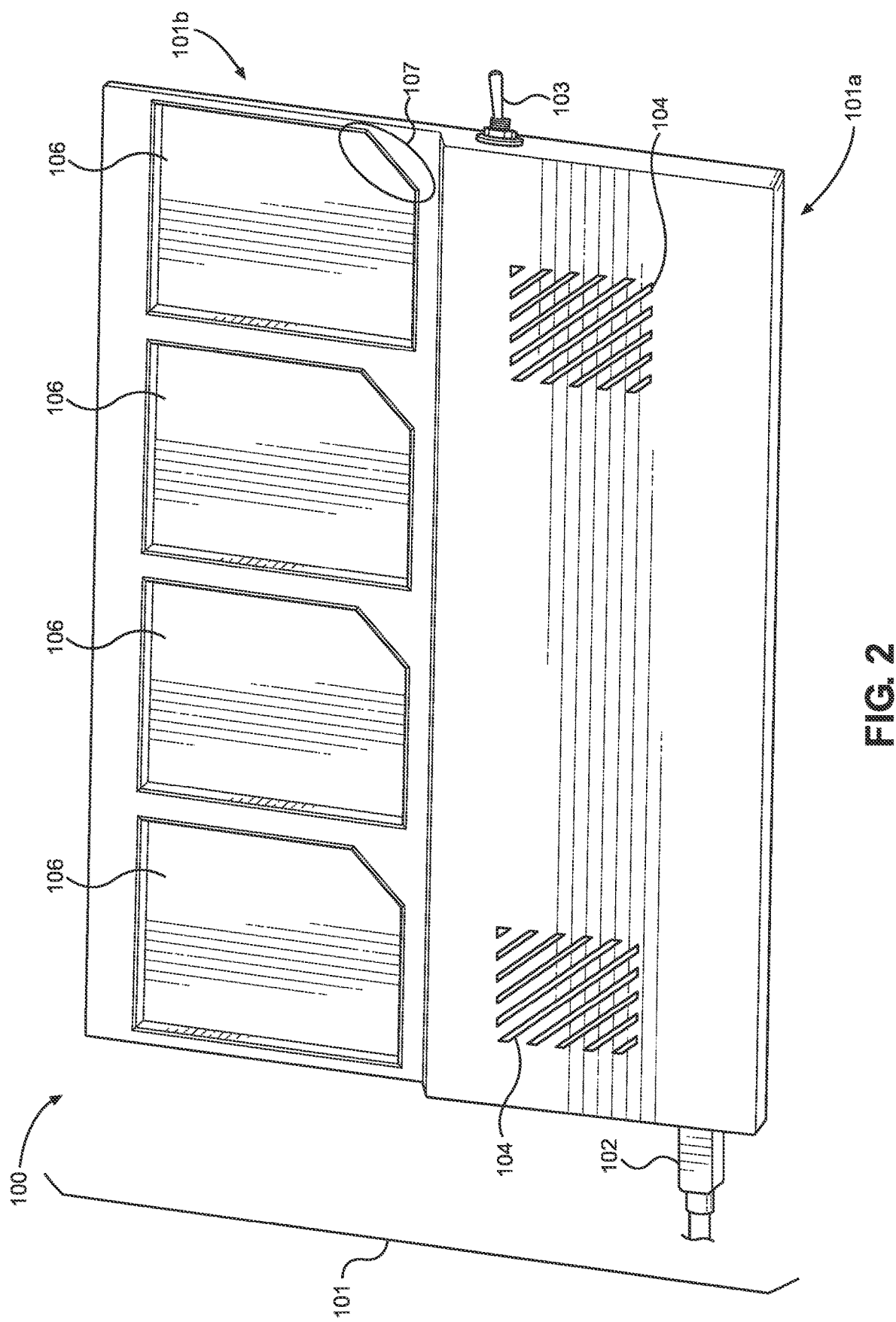
FIG. 2 shows a perspective view of an embodiment of an expanded computer input device.

Referring now to FIG. 2, there is shown a perspective view of an embodiment of an expanded computer input device. In this embodiment several of the features of the computer input device 100 have been duplicated. This will allow for the ability to input multiple items before removing the preceding inputs. In one embodiment the input will be entered when an input object is placed within the indentation 106. In another embodiment the input will be entered once all for the indentations 106 are filled.

In the shown embodiment the computer input device 100 still includes a housing 101. The housing 101 is still comprised of a first section 101a and a second section 101b. There is an input wire 102 which will connect the entire device to a desired computer. In another embodiment instead of an input wire 102 the computer input device 100 will use a wireless connection. Further, there is a single power switch 103, which will activate the computer input device 100. The power indicator is not shown in this embodiment. However, one of ordinary skill in the art will understand that a power indicator could be added to this embodiment without departing from the present invention.

In this embodiment the first section 101a of the housing 101 includes a plurality of vents 104 instead of a single vent. The number of vents 104 is in no way meant to be limiting.

In this embodiment the number of input devices has been increased. This increase has been demonstrated by the increased number of indentations 106. In this embodiment there is an input device located under each indentation 106. In another embodiment there may be a single input reader which stretches along the entirety of the indentations 106.

In the shown embodiment each indentation also has the cutoff corner 107. Further in the shown embodiment there are four indentations 106. In other embodiments different numbers of indentations may be used and the shown number is not intended to be limiting. In other embodiments indentations 106 may not be necessary at all. This is due to the nature of the input device as described herein. If, for example, an RFID input is used, the orientation of the input objects may not matter.

Figure 3:
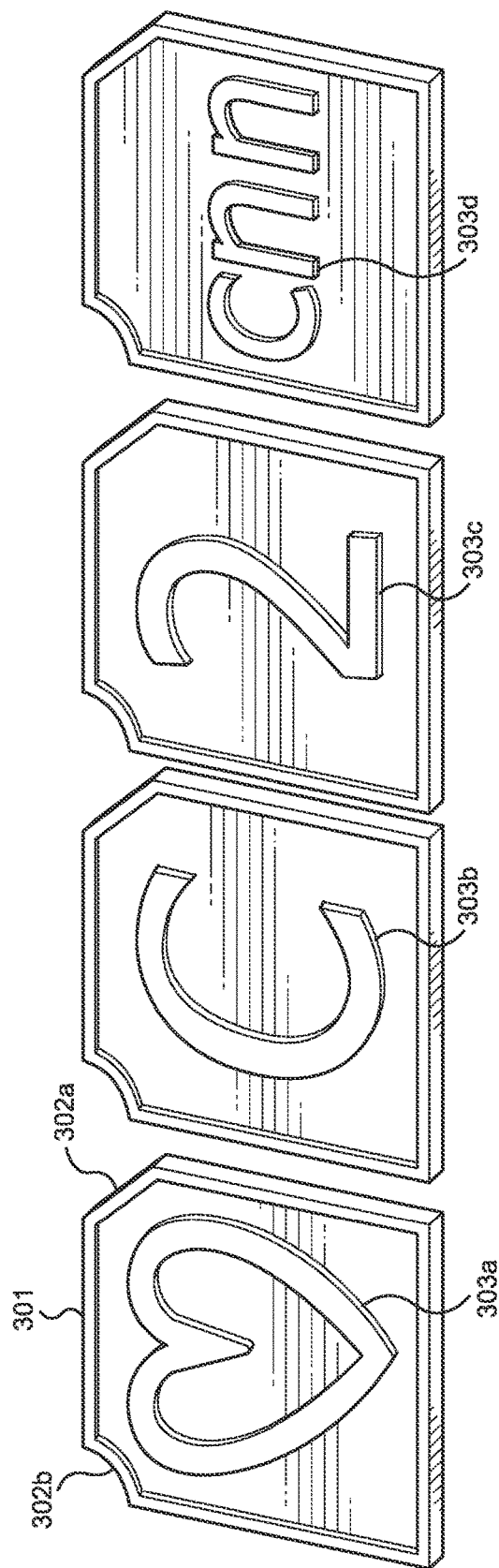
FIG. 3 shows a perspective view of an embodiment of input objects for use with the computer input device.

Referring now to FIG. 3 and FIG. 4, there is shown a perspective view and a rear view of an embodiment of input objects for use with the computer input device. In order to allow for a more interactive and hands-on experience the computer input device uses a plurality of input objects 301. The input objects 301 will allow for a user to pick up a chosen input object 301 and place it on the computer input device 100. The computer input device 100 will read the input object 301 and display the input on a computer. In different embodiments the input objects 301 may include different features. For example, each character of the ASCII character set may be placed on an input object 301. Further, additional characters, character strings, drawings, or other combination of the two may be represented by an input object 301.

In the shown embodiment several different versions of input objects. In one embodiment the input objects 301 have a first cut corner 302a. This first cut corner 302a will match the indentation of the computer input device. In other embodiment the shapes of the indentation and the input objects 301 may vary such that no cut corners are required. In this embodiment the first cut corner 302a will ensure that the input object 301 is properly placed within the computer input device.

In another embodiment there is also a second cut corner 302b. The second cut corner 302b will allow for a user to be able to grip the input object 301 more easily for removal from the computer input device.

The computer input objects 301 are shown with various depictions thereon. In one embodiment the input objects 301 have letters 303b or numbers 303c thereon. These input objects 301 will input the shown letter 303b or number 303c when they are placed on the computer input device. In another embodiment the input object 301 has a depiction or symbol thereon 303a. This symbol 303a will allow for entire words or phrases to be input with the use of a single tile. For example, the shown symbol 303a is a heart. When this input object 301 is placed on the computer input device, the input will be "I love you," which will then be displayed as an output on a computer.

In another embodiment a character string 303d is shown on the input object 301. This embodiment, similar to the symbol 303a, is used to input a larger input at once. In the shown example, the character string 303d is CNN. When this input object 301 is placed on the computer input device the input will be for the CNN website. In one embodiment the input object 301 will open a web browser and open the CNN website. In another embodiment the user must first be in the web browser's URL bar for the input to properly work.

In different embodiments the computer input device may use any manner of input reader such that the identity of the input objects 301 may be determined. Specifically, in FIG. 4A there is shown an embodiment where a Hall Effect device is contemplated as the input reader. Hall Effect devices use magnetic fields to generate input. Therefore, for this embodiment the rear side 301a of the input object 301 is embedded with a plurality of magnets 304. The different positions of the magnets 304 will allow for each input object 301 to have a different input.

Figure 4B:
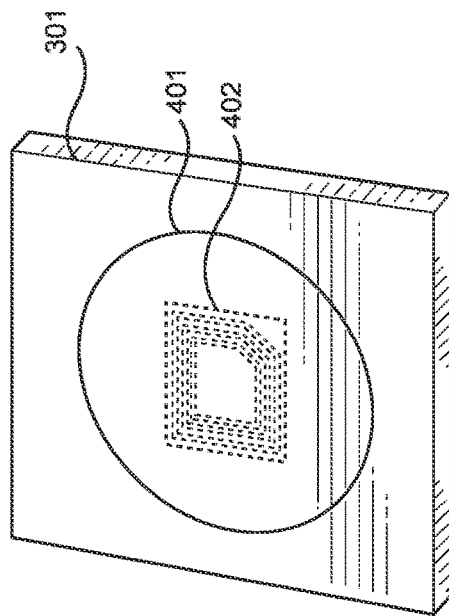
FIG. 4B shows a rear view of an embodiment of input objects for use with the computer input device.
Figure 4A:
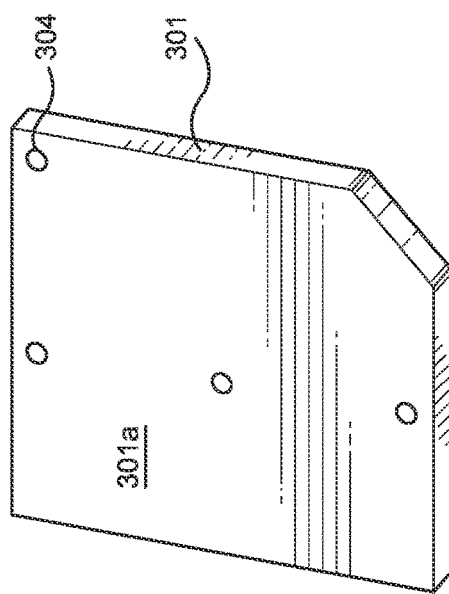
FIG. 4A shows a rear view of an embodiment of input objects for use with the computer input device.

Specifically, in FIG. 4b there is shown an embodiment of an input object for an RFID tag. In this embodiment an RFID tag 402 is placed within an indentation on the back of the input object 301. In one embodiment a cover 401 or other sealing device is then placed over the RFID tag 402. In different embodiments a cover 401 may be placed over any form of information transfer device added to the input object 301. Further, in this embodiment the input object 301 is a full square. This is because an RFID tag is not position specific. It may be read if it is in proper proximity to an RFID tag reader. For an embodiment such as this the computer input device may not have any indentations for the input objects 301 to be placed.

Figure 5:
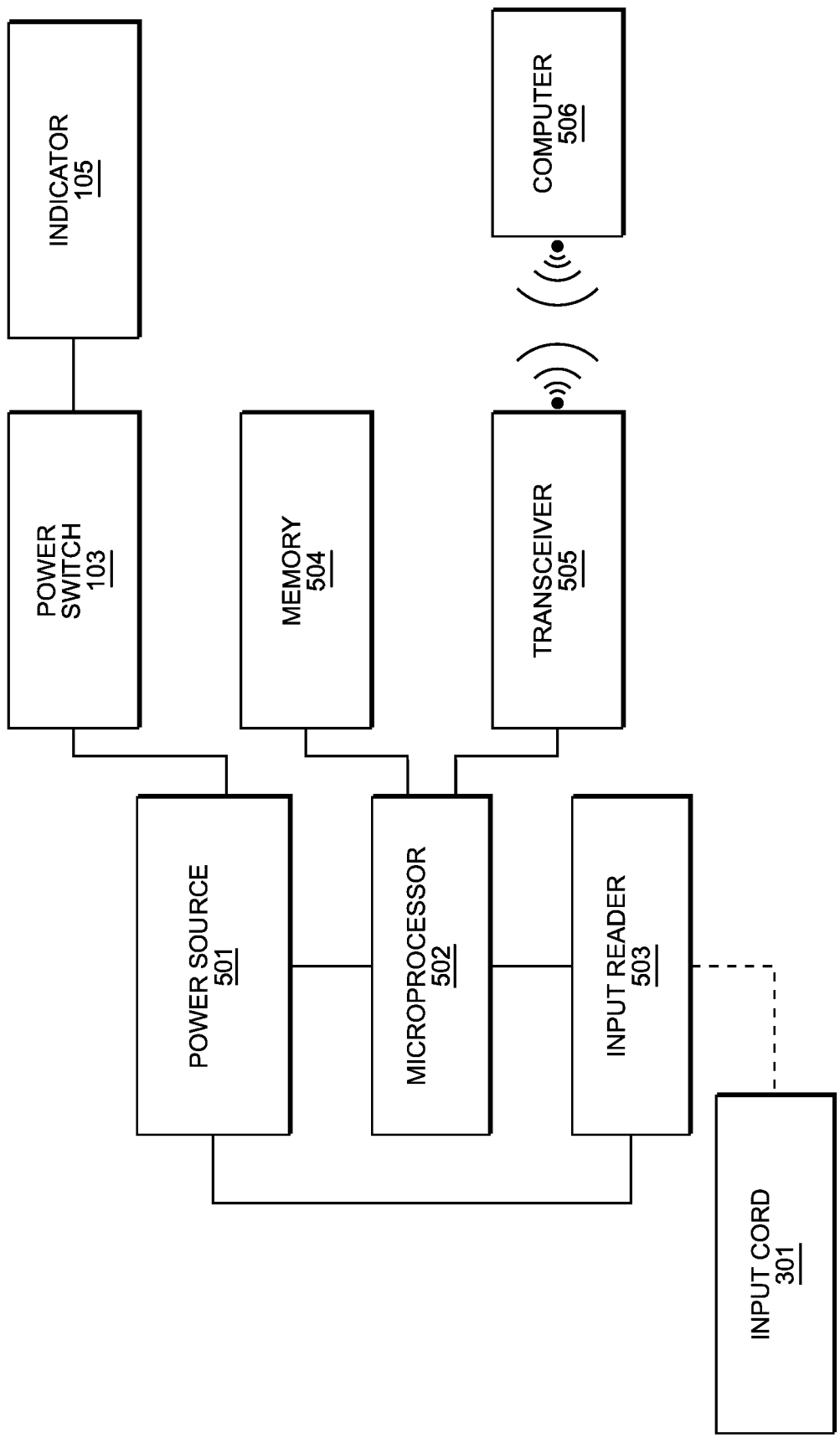
FIG. 5 shows an embodiment of a wiring diagram of the computer input device.

Referring now to FIG. 5, there is shown an embodiment of a wiring diagram of the computer input device. The computer input device includes a power source 501. In one embodiment the power source 501 is the computer 506. In another embodiment the power source 501 is an internal power source such as a battery. This will allow for the computer input device to be wireless as discussed below. In another embodiment the power source could include a plug-in power source. This will prevent the need for batteries and still allow for a wireless connection to the computer.

The power source 501 is operably coupled to a powder switch 103. The power switch will allow for the computer input device to be turned off when not in use, saving power. In one embodiment the power switch 103 is operably coupled to the power indicator 105 as described above. The power indicator 105 will allow a user to know if the computer input device is on and receiving power.

In one embodiment the power source 501 is also operably coupled to a microprocessor 502. The microprocessor 502 is shown to represent any processing power that is needed for the computer input device to properly function, and the type of processor will not affect the spirit of the invention. The microprocessor 502 is operable coupled to a memory 504. This will allow for input types to be stored as needed.

The microprocessor 502 and the power source 501 are operably coupled to the input reader 503. In different embodiments the input reader 503 may come in the form of many different electronic readers and described above. The input reader 503 will read input objects 301 as they are placed thereon.

The microprocessor 502 is operably coupled to a transceiver 505. In one embodiment the transceiver is wired and will send and receive signals with the desired computer 506 via a wired connection. In another embodiment the transceiver 505 is a wireless transceiver and will be able to transmit and receive information to and form the computer 506 wirelessly. One of ordinary skill in the art will understand that there are multiple wireless connection technologies and while each provides different benefits the use of any of them will accomplish the desired action of communicating with the desired computer 506.

Figure 6:
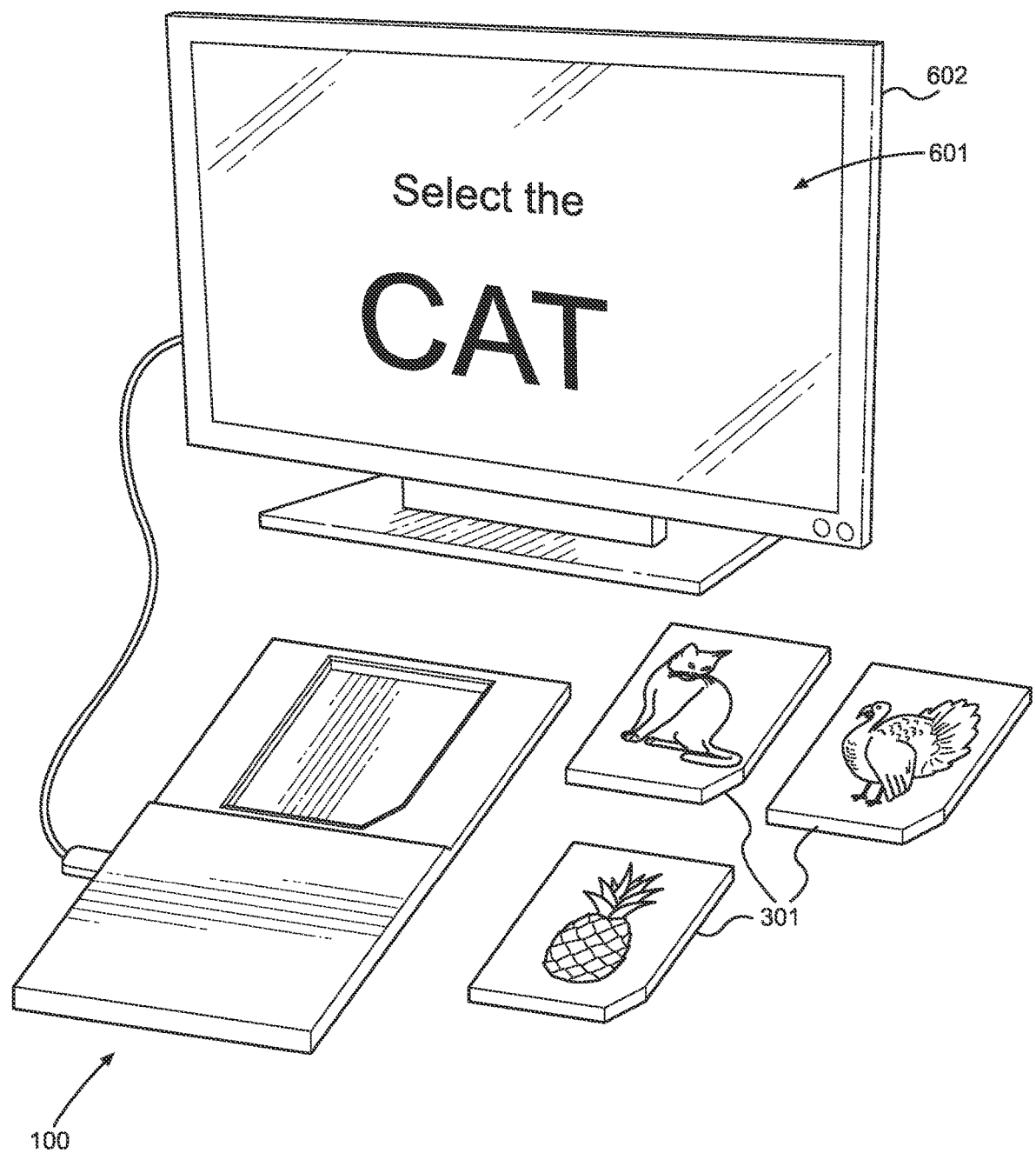
FIG. 6 shows an embodiment of a learning program for use with the computer input device.

Referring now to FIG. 6, there is shown an embodiment of a learning program for use with the computer input device. In one embodiment the computer input device 100 is configured to work with a specific computer program. This is in no way meant to be limiting on the use of the computer input device 100. Even if the specialized program was to be used the computer input device 100 could still be used with the rest of the computer functions.

In one embodiment a learning program 601 is created. In this embodiment the learning program 601 will display various items on a computer screen 602. In the shown example, the computer screen displays "Select the CAT." In this embodiment there are a plurality of input objects 301 which have different symbols thereon. The student will select the appropriate input object 301, in this case the one depicting the cat, and place it on the computer input device 100. If the selected input object 301 is correct the student will progress.

This is just one embodiment of a potential learning program 601. In other embodiments the program could be used to display mathematical formulas and the student will input the answers via the input objects 301. By using the computer input device 100 alongside the learning program 601 a student will be able to have a more hands-on learning experience.

In other embodiments for example, the learning program 601 may display a picture of a cat and ask the user to spell cat. This would then be accomplished by placing the letters CAT on the computer input device 100. In yet another embodiment the user could simply spell cat by placing the correct letters on the computer input device 100. The computer learning program 601 could then display a picture of a cat.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. An education information system, comprising:
   a data reading unit having a housing with a top surface; and
   a plurality of wireless data reading units in the housing, wherein:
      the data reading unit reads educational data, via the wireless data reading units, from at least one card containing the educational data and transmits the educational data to a computer screen for display, and
      each card of the at least one card comprises an embossed icon on a top card surface, the embossed icon representative of the educational data stored on the associated card of the at least one card.

2. The educational information system of claim 1, wherein the at least one card containing educational data is placed proximate to at least one wireless data reading unit of the plurality of wireless data reading units.

3. The educational information system of claim 2, wherein the at least one card is a radiofrequency identification (RFID) card.

4. The educational information system of claim 1, wherein the educational data includes instructions for an action for a computer to perform.

5. The educational information system of claim 4, wherein the action is opening a webpage associated with the at least one card.

6. The educational information system of claim 1, wherein the educational data includes an image representing a word to be displayed on the computer screen.

7. The educational information system of claim 1, wherein the educational data represents words that are arranged to form a sentence.

8. The educational information system of claim 1, wherein the top surface of the housing is flat.

9. A method of conveying education information, the method comprising:
   reading educational data, from at least one card containing the educational data, via a data reading unit having a housing with a top surface and a plurality of wireless data reading units;
   transmitting the educational data to a computer; and
   displaying the educational data on a screen on the computer,
   wherein each card of the at least one card comprises an embossed icon on a top card surface, the embossed icon representative of the educational data stored on the associated card of the at least one card.

10. The method of claim 9, further comprising placing a card containing educational data proximate to at least one wireless data reading unit of the plurality of wireless data reading units.

11. The method of claim 10, wherein the at least one card is an RFID card.

12. The method of claim 9, wherein the educational data includes instructions for an action for a computer to perform.

13. The method of claim 12, wherein the action is opening a webpage associated with the card.

14. The method of claim 9, wherein the educational data includes an image representing a word to be displayed on the screen.

15. The method of claim 9, wherein the educational data represents words that are arranged to form a sentence.

16. The method of claim 9, wherein the top surface of the housing is flat.

* * * * *